United States Patent [19]

Treviño et al.

[11] 4,374,020

[45] Feb. 15, 1983

[54] CATALYTIC HYDROCONVERSION PROCESS WITH CATALYST RETAINER

[75] Inventors: Cesar A. Treviño, Baytown; Richard G. Stellman, Seabrook, both of Tex.

[73] Assignee: Shell Oil Company, Houston, Tex.

[21] Appl. No.: 25,227

[22] Filed: Mar. 29, 1979

Related U.S. Application Data

[60] Continuation of Ser. No. 840,928, Oct. 11, 1977, abandoned, which is a division of Ser. No. 720,556, Sep. 7, 1976, abandoned.

[51] Int. Cl.³ .................... C10G 45/08; C10G 45/60; C10G 47/10
[52] U.S. Cl. ................................ 208/216 R; 208/111; 208/112; 208/143; 208/251 H; 208/254 H; 208/210
[58] Field of Search .................. 208/111, 112, 216 R, 208/216 PP, 143, 89

[56] References Cited

U.S. PATENT DOCUMENTS

| | | | |
|---|---|---|---|
| 3,094,480 | 6/1963 | Richardson | 208/216 R |
| 3,159,568 | 12/1964 | Price et al. | 208/89 |
| 3,162,607 | 12/1964 | Burbidge et al. | 208/216 R |
| 3,403,111 | 9/1968 | Colgan et al. | 208/217 |
| 3,546,104 | 12/1970 | Kuwata et al. | 208/217 |
| 3,843,509 | 10/1974 | Suto et al. | 208/112 |

*Primary Examiner*—Delbert E. Gantz
*Assistant Examiner*—O. Chaudhuri
*Attorney, Agent, or Firm*—John M. Duncan; Ronald R. Reper

[57] ABSTRACT

An improved process for hydroconversion of mineral oil is disclosed wherein a spherical hydroconversion catalyst having a diameter greater than 6 mm, a surface area above 200 $m^2/gm$, and a crush strength above 70 pounds is used to replace the inert materials which are used to support or retain a fixed bed of suitable hydroconversion catalyst.

6 Claims, No Drawings

CATALYTIC HYDROCONVERSION PROCESS WITH CATALYST RETAINER

This is a continuation of application Ser. No. 840,928, filed Oct. 11, 1977, which was a divisional application of Ser. No. 720,556 filed Sept. 7, 1976, now abandoned.

BACKGROUND OF THE INVENTION

This invention relates to an improved hydroconversion catalyst wherein the improvement is attributed to particular physical characteristics of the alumina-based catalyst, and to hydroconversion processes employing it such as hydrogenation, hydrodemetallization, hydrodesulfurization and hydrodenitrogenation.

It is well known to purify mineral oils such as crude oil, petroleum fractions, shale oils, coal tar distillates, petroleum residues and the like with hydrogen in the presence of a catalyst. Typically the catalyst is deployed in the hydroconversion zone in one or more fixed beds. Often these beds are supported or retained at their inlet or outlet, or both by materials which are inert to the reaction, in order to facilitate even distribution of the feedstock, that is, to prevent or reduce channeling through the catalyst bed; and to trap undesirable materials in the feedstock such as corrosion products and other particulate matter as may be present in the feedstock, in order to prevent such undesirable material from plugging or otherwise deactivating the catalyst bed. The inert materials, which conventionally are in the form of pellets or spheres, typically must be resistant to crushing under the weight of catalyst beds which in an upright reactor may have depths of 50 feet or more.

In many large hydroconversion reactors such as employed in petroleum refining, the inerts will occupy a substantial portion of the reaction zone, e.g. up to 15 to 20% or more of the reaction zone volume. Further, many hydroconversion processes often employ high pressures up to several thousand pounds of pressure requiring expensive pressure reactors. Accordingly, the use of inerts adds to the capital expense of a hydroconversion process both for the reactors which must be oversized to accommodate the inerts and for the costs of the inerts which do not contribute in any significant manner to desired hydroconversion of the feedstock. In addition, it would be highly desirable to increase the efficacy of existing hydroconversion processes by replacing the volume of inerts in the reaction zone with an active catalyst capable not only of performing the functions of the inert materials, but of enhancing the desired conversion process as well. Thus the development of a catalyst which would make it possible to carry out hydrotreatment at greater efficiency and lower cost was desired.

SUMMARY OF THE INVENTION

According to the invention there is provided a process using an improved hydroconversion spherical catalyst consisting essentially of alumina, containing up to about 6% silica, as support, and from about 2 to about 20% by weight of a Group VI-B metal and from about 0.5 to about 10% by weight of Group VIII metal each in the form of metals or their oxides or sulfides and having a diameter greater than 6 mm, a surface area above 200 m$^2$/gm and a crush strength above 70 pounds to replace inert materials supporting or retaining a fixed catalyst bed.

The invention further comprises passing mineral oil feedstock and a hydrogen-containing gas through a reaction zone at elevated temperature and pressure and recovering the hydroconverted oil from the reaction zone.

DESCRIPTION OF THE PREFERRED EMBODIMENTS

The spherical alumina-based supports for the catalyst according to the invention are preferably gamma or eta alumina. They may be prepared according to known processes in sizes from about 6 to about 30 mm. Generally spherical particles less than 6 mm tend to plug more readily and are less effective in distributing feed across the initial contact layer of catalyst, whereas the use of spherical particles having diameters above about 25–30 mm results in catalysts having significantly lower activity. Preferred are particles having diameters above 9 mm and particularly above 13 mm.

Preferably the catalysts of the invention are employed as mixtures of particles having a size ratio in the range from about 1.5:1 to about 3:1. Thus for example the support materials may comprise mixtures of particles from about 6 to 9 mm to about 8 to 25 mm. A particularly preferred catalyst comprises mixtures of particles in the range from about 6 to about 13 mm. The term "spherical" herein refers to particles having both a true rounded shape and those generally spheroidal particles which do not pass perfectly rounded configurations. Procedures for preparing these particles are known in the art and are not part of the present invention.

The support is further characterized by a surface area greater than 200 square meters per gram and preferably above 250 square meters per gram and which may extend up to 600 square meters per gram or more. Catalysts prepared from alumina having a surface area of less than 200 square meters per gram generally have poorer activity when employed in the present hydroconversion process in comparison to catalysts in which the alumina based support initially is characterized by a surface area in substantial excess of 200 square meters per gram. The term "surface area" as used herein designates the surface area as determined by the adsorption of nitrogen according to the method of Brunnauer et al., Journal of the American Chemical Society 60, 309 et. seq. (1938).

The alumina-based support is preferably all alumina but may contain minor amounts, i.e. up to 6% by weight of silica. The silica may be incorporated into the alumina prior to shaping, but preferably is applied as a surface coating to the preformed alumina, e.g. with sodium silicate, according to procedures well known in the art. Preferred as catalyst supports are spherical aluminas having crush strength above 80 pounds and particularly preferred are supports having crush strengths above 90 pounds.

The crush strength herein refers to the average value obtained on at least 20 spherical particles by the following procedure:

A catalyst particle is placed between two parallel horizontal plates, one stationary and one moveable. A gradually increasing force is applied to the moveable plate perpendicular to the surface of the plate until the catalyst particle breaks. That force in pounds which was applied at the instant the particle breaks is considered as the crush strength.

The catalyst according to this invention comprises a metal of Group VI-B and a metal of Group VIII compounded with the alumina-based support. Accordingly, the catalyst may comprise at least one of chromium, molybdenum and tungsten in combination with at least one of e.g. iron, nickel, cobalt, platinum, palladium and iridium. Of the Group VI-B metals, molybdenum is most preferred. The final catalyst most suitable will contain from about 2 to about 20 percent by weight of Group VI-B metal. Of the Group VIII metals, nickel and cobalt are preferred. The amount of Group VIII metal in the final catalyst suitably will be in the range from about 0.5 to about 10 percent by weight. Particularly effective catalysts are obtained utilizing as Group VIII metal nickel or cobalt, and molybdenum in a weight ratio of Group VIII metal to molybdenum from about 0.20:1 to about 0.55:1, with a ratio of from about 0.25:1 to about 0.5:1 being preferred.

The metal components can be composited with the alumina-based spherical particles in any suitable manner. For example, the particles can be impregnated by dipping or soaking utilizing individual solutions of a suitable compound of a Group VI-B metal and a suitable Group VIII metal compound, in any convenient sequence. Alternatively the metals may be composited with the spherical alumina particles in a common solution containing suitable compounds of both a Group VI-B metal and a Group VIII metal. Suitable compounds of Group VI-B metals include molybdic acid, ammonium molybdate, ammonium paramolybdate, chromium acetate, chromous chloride, ammonium metatungstate, tungstic acid etc. Compounds of Group VIII which are suitable include cobalt chloride, cobalt carbonate, cobalt sulfate, cobalt nitrate, cobalt fluoride, nickel nitrate, nickel sulfate, nickel bromide, nickel acetate, nickel formate, nickel carbonate, ferric nitrate, ferric formate, ferric acetate, platinum chloride, chloroplatinic acid, palladium chloride etc. The compositing may be facilitated by the use of compositing aids such as ammonium hydroxide. After all the catalytic components are present in the final catalyst composite, the particles suitably are dried for a period of 1 to 20 hours at temperatures from about 90° to about 150° C. and calcined in an oxidizing atmosphere such as air at temperatures from about 400°–700° C. for a period from about 1 to about 10 hours or more.

The finished catalyst is usually activated in the presence of hydrogen preferably containing about 1–30 mole percent of hydrogen sulfide at a temperature between 150° and 400° C. prior to its use.

The finished catalyst is useful for effecting various mineral oil conversion reactions such as desulfurization, denitrogenation, hydrogenation and the like. Accordingly, the process of the invention comprises passing mineral oil feedstock and a hydrogen containing gas through a reaction zone containing the catalyst of the invention at an elevated temperature of 100°–500° C. and a total pressure of 5.0–10,000 psig and recovering the hydroconverted oil from the reaction zone. The catalyst is suitable employed at liquid hourly space velocities (LHSV) from about 0.2 to about 12, and from about 300 to 10,000 cubic feet of added hydrogen per barrel of feed. Particularly preferred conditions are temperatures in the range from about 250° to 475° C., total pressures from about 100 to about 5000 psig, liquid hourly space velocities from about 0.4 to about 9 and 500 to 2500 cubic feet of added hydrogen per barrel of feed.

Owing to the unique combination of physical properties the particularly preferred embodiment of the process of the invention utilizes an upright reaction zone wherein the feedstock contacts initially and/or finally catalyst according to the invention. That is the catalyst of the invention will substantially or entirely replace the inert pellets, balls or spheres conventionally employed, resulting in higher catalyst activity and conversion efficiency. For many existing hydroconversion processes the catalyst according to the invention will suitably replace only the inert material while retaining the catalyst heretofore employed for hydrodesulfurization, hydrodenitrogenation, hydrocracking and the like. That is, the catalyst according to the invention will be disposed in layers having a depth from a few to a few hundred centimeters above and/or below the conventionally employed catalyst. This is particularly useful for processes employing highly packed small sized extrudated since the generally larger spherical catalyst of the invention, owing to configuration, will have a greater void fraction for particulate retention. However the duration of satisfactory operation will generally be much longer when employing the catalyst of the invention, than if the inerts were replaced solely with e.g. small sized extrudates. Unexpectedly, it has been found that for hydrogenation of highly unsaturated feedstocks such as pyrollizates, e.g. distillates from steam cracking of hydrocarbons such as naphthas and gas oils, the use of the instant catalysts in place of conventional inerts of like size results in significant reduction of polymeric deposits within the reaction zone.

Accordingly the enhanced activity of the reaction zone employing the catalyst of the invvention can be used to reduce the operating temperatures conventionally employed, thereby conserving expensive fuel, or where equipment permits to increase throughout for a given conversion level.

In order to illustrate the method of the present invention the following examples are given:

EXAMPLE I 2400 pounds of a mixture of alumina spheres obtained commercially and having particle size in the range from about 6 to 13 mm was impregnated with a solution containing 225 pounds of nickel nitrate hexahydrate and 250 pounds of ammonium dimolybdate in a mixture of 55.8 gallons of aqua ammonia and 34.6 gallons of water. The spheres were separated from the solution, and dried at about 95° C. for 1 hour. The dried composite spheres, which were calcined in air for about 1 hour at about 500° C., were found to contain 1.8% w nickel and 5.4% w molybdenum. The catalyst had a surface area of about 300 m$^2$/gm and a crush strength of about 82.2 pounds.

About 10 cubic centimeters (8.3 grams) of the catalyst was placed in a fixed bed upright tubular reactor. The catalyst was sulfided by circulating hydrogen gas containing 5% by weight H$_2$S for 2 hours at about 204° C. for 1 hour at about 260° C. and finally for 2 hours at about 371° C. A mid-continent catalytically cracked heavy gas oil was charged down flow through the bed in a once through operation at a liquid hourly space velocity of about 1.5 and in admixture with recycle hydrogen. The hydrogen was recycled to the reactor at the rate of about 4.0 hydrogen to oil ratio. The feedstock had a 50% w boiling point of about 350° C., on API gravity of 17.1 at 60° F., a carbon content of 88.03% w, a hydrogen content of 10.51% w, a sulfur concentration of 1.37% w and a nitrogen concentration of 87 parts per million. The feedstock was preheated entering the catalyst bed at a temperature of about 343° C. and a total pressure of 850 psig. The catalyst was found to be effective for hydrogenation resulting in hydrogen consumption of 311 SCF of hydrogen per barrel, the hydrotreated product analyzed 0.59% w sulfur and 643 ppm nitrogen.

For purposes of comparison the above procedure was repeated except that a portion of the unimpregnated alumina support was used in place of the catalyst. No hydrogen consumption, desulfurization or denitrogenation activity was found.

For further purposes of comparison, the above procedure was again repeated except that the catalyst was replaced using commerically available inert spherical material available from Norton and having a particle size of about 6-8 mm and a crash strength above 100 pounds. This material too was found not to have any significant hydroconversion effect. The results of the above tests are summarized in the following table.

| Hydroconversion Product Properties | | | |
| --- | --- | --- | --- |
|  | Catalyst of the Invention | Support | Inert |
| Hydrogen consumed SCF H$_2$/BBL | 311 | 0 | 0 |
| Nitrogen, ppm | 643 | 871 | 871 |
| Sulfur, % w | 0.59 | 1.37 | 1.37 |

EXAMPLE II

The catalyst preparation procedure of Example I was repeated except that in place of the nickel nitrate, 225 pounds of cobalt nitrate hexahydrate was used in the solution and 2500 pounds of alumina spheres was used. The final catalyst spheres were found to contain 1.8% w of cobalt, 5.4% w molybdenum, had a surface area of above about 300 m$^2$/gm and a crush strength of about 91 pounds.

The general procedure of Example I was repeated except the feedstock was a straight run gas oil having an API Gravity of 22.8 at 60° F., a carbon content of 85.24, a hydrogen content of 12.05, a sulfur content of 2.57% w and and a nitrogen content of 1300 ppm. The reaction conditions included a temperature of about 371° C., a total pressure of 800 psig, a hydrogen rate of 2000 SCF/barrel and a liquid hourly space velocity of 2.0.

The product was found to contain 1.1% sulfur and 970 pps nitrogen.

What is claimed is:

1. A catalytic process for the hydroconversion of mineral oil which comprises (a) first contacting a mineral oil feedstock and a hydrogen-containing gas in an upright reaction zone with a layer of spherical hydroconversion catalyst support and/or retainer which is larger than a conventional catalyst subsequently employed in the process and which consists essentially of alumina containing up to 6% by weight of silica as a support, and from about 2 to about 20% by weight of Group VI-B metal and about 0.5 to about 10% by weight Group VIII metal, each in the form of metals, their oxides or sulfides, and having a diameter of greater than 6 mm up to about 30 mm, a surface area above 200 m$^2$/gm and a crush strength above 70 pounds, at an elevated temperature of 100°–500° C., a total pressure of 5.0–10,000 psig, a liquid hourly space velocity from about 0.2 to about 12 and from about 300 to 10,000 cubic feet of added hydrogen per barrel of feed, said layer of spherical catalyst support and/or retainer being disposed above and below said conventionally employed catalyst bed having a depth sufficient to require inert pellets, balls or spheres as a retainer and/or support for said conventionally employed catayst; (b) then contacting said feed in said reaction zone with said conventional extruded smaller sized hydroconversion catalyst at the same operating conditions; (c) followed by contacting said feed with another layer of said spherical hydroconversion catalyst support and/or retainer as set out in step (a) and (d) recovering the hydroconverted oil from the reaction zone.

2. The process of claim 1 wherein the Group VI-B metal is molybdenum and the Group VIII metal is nickel or cobalt.

3. The process of claim 2 wherein the crush strength is above 80 pounds, and the weight ratio of Group VIII metal to molybdenum is from about 0.20 to about 0.55.

4. The process of claim 1 wherein the spherical catalyst support is gamma or eta alumina.

5. The process of claim 4 wherein the spherical hydrocarbon catalyst has a particle diameter above 9 mm.

6. The process of claim 5 wherein the particle diameter is above 13 mm.

* * * * *